United States Patent
Peterle et al.

(10) Patent No.: US 9,488,378 B2
(45) Date of Patent: Nov. 8, 2016

(54) TUBULAR SECTION BAR FOR A BIPHASIC RADIATOR AND RELATIVE BIPHASIC RADIATOR

(75) Inventors: Michele Peterle, San Pietro di Feletto (IT); Simone Visentin, Santa Lucia di Piave (IT); Diego Trentin, Mareno di Piave (IT); Federico Zoppas, Treviso (IT)

(73) Assignee: I.R.C.A. S.P.A. INDUSTRIA RESISTENZE CORAZZATE E AFFFINI, San Vendemiano (IT)

(*) Notice: Subject to any disclaimer, the term of this patent is extended or adjusted under 35 U.S.C. 154(b) by 444 days.

(21) Appl. No.: 14/240,997

(22) PCT Filed: Aug. 24, 2012

(86) PCT No.: PCT/IB2012/054291
§ 371 (c)(1),
(2), (4) Date: Feb. 25, 2014

(87) PCT Pub. No.: WO2013/027192
PCT Pub. Date: Feb. 28, 2013

(65) Prior Publication Data
US 2014/0217190 A1    Aug. 7, 2014

(30) Foreign Application Priority Data
Aug. 25, 2011  (IT) .............................. RM2011A0448

(51) Int. Cl.
*F24D 3/16* (2006.01)
*F24D 13/04* (2006.01)
(Continued)

(52) U.S. Cl.
CPC ................ *F24D 13/04* (2013.01); *F24D 3/16* (2013.01); *F24H 3/004* (2013.01); *F28D 1/0226* (2013.01);
(Continued)

(58) Field of Classification Search
CPC ............. F23D 3/16; F23D 3/14; F23D 3/12; F23D 13/04; F24H 3/004; F28D 1/0226; F28F 1/022; F28F 1/16; F28F 1/20; F28F 9/182; F28F 9/262; F28F 2220/00; F24D 2220/00; F24D 2220/0285; F24D 2220/2027; F24D 2220/2054; F24D 15/02; Y02B 30/22; Y02B 30/36
USPC .......... 237/71, 70, 74; 165/49, 73, 149, 168, 165/181, 183
IPC ................. F24D 3/16, 13/04; F28F 1/16, 1/14, F28F 1/02, 1/04; F28D 1/04, 1/02
See application file for complete search history.

(56) References Cited

U.S. PATENT DOCUMENTS 421,042 A * 2/1890 Blackmore ..................... 138/46
622,872 A * 4/1899 Thornycroft ............ F28D 7/024
                                                    122/235.14

(Continued)

FOREIGN PATENT DOCUMENTS

CN   103196317 A * 7/2013
DE   6609315        4/1972
(Continued)

OTHER PUBLICATIONS

International Search Report and Written Opinion dated Nov. 15, 2012 for corresponding international patent application No. PCT/IB2012/054291.

*Primary Examiner* — Gregory Huson
*Assistant Examiner* — Daniel E Namay
(74) *Attorney, Agent, or Firm* — Abelman, Frayne & Schwab

(57) ABSTRACT

A tubular section bar (100) for a biphasic≥radiator comprising a tubular body (10) having a perimeter surface, a surface lug (11-21) protruding from at least one portion of said perimeter surface; each lug is perpendicular to the perimeter surface and has a height (H); two consecutive lugs are arranged at a reciprocal distance (D) and so that the relation between the reciprocal distance (D) and height (H) is greater or equal to 1.4 (D:H≥1,4).

16 Claims, 6 Drawing Sheets

(51) Int. Cl.
  *F28F 1/16* (2006.01)
  *F28D 1/02* (2006.01)
  *F24H 3/00* (2006.01)
  *F28F 1/02* (2006.01)
  *F28F 1/20* (2006.01)
  *F28D 1/04* (2006.01)
  *F24D 15/02* (2006.01)
  *F28F 9/18* (2006.01)
  *F28F 9/26* (2006.01)

(52) U.S. Cl.
  CPC ............... *F28F 1/022* (2013.01); *F28F 1/16* (2013.01); *F28F 1/20* (2013.01); *F24D 15/02* (2013.01); *F24D 2220/07* (2013.01); *F24D 2220/2027* (2013.01); *F24D 2220/2054* (2013.01); *F28F 9/182* (2013.01); *F28F 9/262* (2013.01); *F28F 2220/00* (2013.01)

(56) References Cited

U.S. PATENT DOCUMENTS

| | | | | |
|---|---|---|---|---|
| 671,768 | A * | 4/1901 | Knox | F28F 1/12 165/181 |
| 753,031 | A * | 2/1904 | Aylsworth | 165/130 |
| 1,461,726 | A * | 7/1923 | Crafts | F01P 11/0295 123/41.14 |
| 1,860,573 | A | 5/1932 | Deutsch | |
| 2,785,542 | A * | 3/1957 | Thomas | F25B 39/04 165/142 |
| 2,874,555 | A * | 2/1959 | Disinger | F25B 39/02 165/146 |
| 3,247,583 | A * | 4/1966 | Ants | B21D 53/04 165/168 |
| 3,368,615 | A * | 2/1968 | Brown | F25B 39/02 165/149 |
| 6,116,334 | A * | 9/2000 | Di Tomaso | F28F 9/001 165/134.1 |
| 6,257,326 | B1 * | 7/2001 | Heinrich | C21B 7/10 165/162 |
| 2006/0168812 | A1 * | 8/2006 | Insalaco | F28F 1/022 29/890.05 |
| 2008/0196876 | A1 * | 8/2008 | Cao | F28F 1/36 165/181 |
| 2009/0139701 | A1 * | 6/2009 | Qu | F28F 3/048 165/168 |
| 2012/0111551 | A1 * | 5/2012 | Cao | F28F 1/36 165/181 |

FOREIGN PATENT DOCUMENTS

| | | | |
|---|---|---|---|
| EP | 0693171 | 10/1999 | |
| FR | 2824386 A1 * | 11/2002 | ............. F24D 13/04 |
| GB | 1597272 | 9/1981 | |
| GB | 2167549 A * | 5/1986 | ........... F28D 1/0233 |
| WO | 94/23257 | 10/1994 | |
| WO | 00/70286 | 11/2000 | |
| WO | 2006/025638 | 3/2006 | |
| WO | 2010/081957 | 7/2010 | |
| WO | 2011/045653 | 4/2011 | |

* cited by examiner

TUBULAR SECTION BAR FOR A BIPHASIC RADIATOR AND RELATIVE BIPHASIC RADIATOR

CROSS REFERENCE TO RELATED APPLICATIONS

This application is a national phase of PCT application No. PCT/IB2012/054291, filed Aug. 24, 2012, which claims priority to IT patent application No. RM2011A000448, filed Aug. 25, 2011, all of which are incorporated herein by reference thereto.

FIELD OF THE INVENTION

The present invention relates to a tubular section bar for a biphasic radiator and relative biphasic radiator in the field of civil and industrial space heating.

STATE OF THE ART

The operating principle of biphasic heat exchange allows an even distribution of the heat absorbed from a concentrated heat source to the radiating body taking advantage of the entire heat exchange surface with the outside, which is at a constant, even temperature, maximizing the radiating efficiency.

The concentrated heat source heats the fluid, initially in the liquid state, contained in the radiating body. The fluid evaporates by rising up suitable cavities of the radiating body and, by condensing on the internal walls of the same, forms a film or drops which descend in order to be re-heated. The condensed liquid film, which descends lapping against the radiating body internal walls, provides the heat exchange with the environment outside the radiating body at nearly constant temperature and thermal flow per unit area.

The principle can also be extended to radiating panels for heating not only rooms, but also foodstuff cooking structures.

Therefore, heat exchangers which take advantage of the biphasic vector fluid technology prove to be particularly efficient.

The concentrated source may be of any kind, including the electric one.

By using the electric heating technology combined with a biphasic vector fluid-type heat exchange, it is possible to obtain radiators which are particularly compact and efficient for heating rooms.

The thermal behaviour of a biphasic radiator is completely different from a traditional single-phase vector fluid-type radiator, such as the known thermosiphons.

The known art used in traditional radiators teaches to increase the cooling fins in order to improve the heat exchange. This, however, leads to the radiating body being made heavier and, obviously, to increasing the cost thereof due to the greater quantity of material used for its construction.

An increase in weight of the radiating body slows down the heating speed of the room due to the thermal inertia of the radiating body, reducing the comfort and penalizing the biphasic heat exchange, especially in the start-up transients.

In fact, on start-up of the radiator (step input), the radiating body, being at low temperature, exchanges heat with the concentrated thermal source and the external environment mainly by thermal convection and a large part of the heat supplied by the electrical resistor is accumulated by the radiating body and the vector fluid.

The greater the weight of the radiator, the more energy it must accumulate in order to get up to temperature and the lower its capacity for heat exchange with the room during the transients.

These factors simultaneously determine overtemperature of the fluid within the radiator due to the fact that the energy which the body is not able to quickly exchange with the external environment or accumulate is stored in the fluid, increasing the temperature and potentially damaging the biphasic heat exchange mechanism with the risk of establishing the so-called "film boiling" condition, in which the formation occurs of a layer of vapour which completely covers the concentrated source heating surface, to great detriment for the heat exchange, thus losing the advantages of the biphasic heat exchange.

The hydrodynamic crisis which leads to the film boiling is essentially due to the high temperature which leads to high relative speeds between descending liquid and ascending vapour, which are so high that the vapour draws away the liquid from the heating surface while at the same time the liquid retains the vapour produced next to the surface, thus forming the vapour layer which covers the concentrated source heating surface.

In such a circumstance, hot spots are determined, thus invalidating the fundamental object of the biphasic heating.

SUMMARY OF THE INVENTION

The object of the present invention is to provide a tubular section bar for a biphasic radiator adapted to improve the overall heat exchange of a radiator incorporating the tubular section bar.

The object of the present invention is a tubular section bar for a biphasic radiator which, in accordance with claim 1, comprises a tubular body having a perimeter surface and defining a longitudinal axis, several surface lugs protruding radially at a height H from at least one portion of said perimeter surface and extending in an axial direction, two consecutive lugs being arranged at a reciprocal distance D, the section bar being characterized in that a relation between said reciprocal distance D and said height H is greater than or equal to 1.4

$$\left(\frac{D}{H} \geq 1,4\right).$$

Said section bar advantageously has a finning with a number of fins so as to maximize the relation between the heat exchange and the weight of said section bar.

A further object of the invention is to provide a biphasic radiator comprising said tubular section bar which is capable of notably improving the heat exchange with the external environment.

Another object of the present invention is a biphasic radiator, according to claim 5, comprising at least one tubular element made by means of the aforementioned tubular section bar.

Advantageously, the construction details related to the radiator obtained by means of the aforementioned tubular section bar also allow an improvement of the thermodynamic behaviour of the obtained radiator, as described in the detailed description which follows.

The dependent claims describe preferred embodiments of the invention, forming an integral part of the present description.

BRIEF DESCRIPTION OF THE DRAWINGS

Further features and advantages of the invention will become clearer in view of the detailed description of preferred but not exclusive embodiments of a tubular section bar for a biphasic radiator and relative biphasic radiator, shown by way of non-limiting example with the aid of the attached drawings in which.

The same reference numbers and letters in the figures identify the same elements or components.

DETAILED DESCRIPTION OF A PREFERRED EMBODIMENT OF THE INVENTION

According to the present invention, and with particular reference to the figures, the tubular section bar 100 which is the object of the present invention comprises a tubular body 10 having a finning which protrudes perpendicularly to the lateral surface of tubular body 10. The section bar has a first portion or face 101 intended to face a room to be heated and a second portion or face 102 intended to face a supporting wall delimiting the room or internal thereto. Said face 102 is adapted to be associated with said supporting wall.

Figure 1:
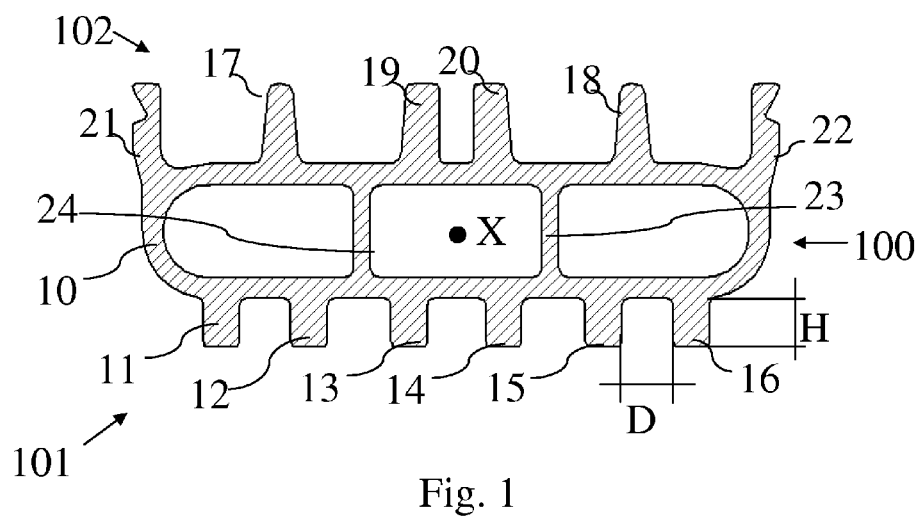
FIG. 1 depicts a cross-section of a tubular section bar according to the present invention.
Figure 2:
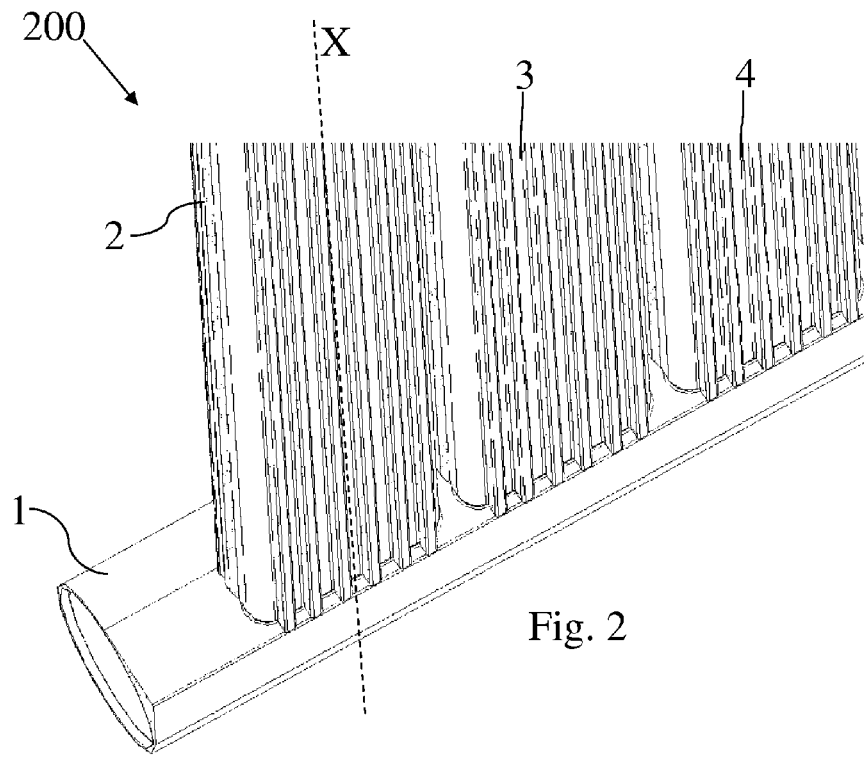
FIG. 2 depicts a perspective view of a portion of a radiator comprising tubular elements obtained from the section bar in FIG. 1.

It is preferred that said tubular body 100 has a flattened shape. In other words, the cross-section according to FIG. 1 has two opposite faces 101 and 102 which are substantially flat and parallel to each other, so that the fins are also flat and parallel to each other. From faces 101 and 102, the fins 11-22 protrude which extend parallel to the longitudinal development X of tubular body 100 and substantially perpendicular to the two opposite faces 101 and 102.

First face 101 comprises fins 11-16, having an exclusively thermal purpose, i.e. intended for heat exchange functions.

Figure 6:
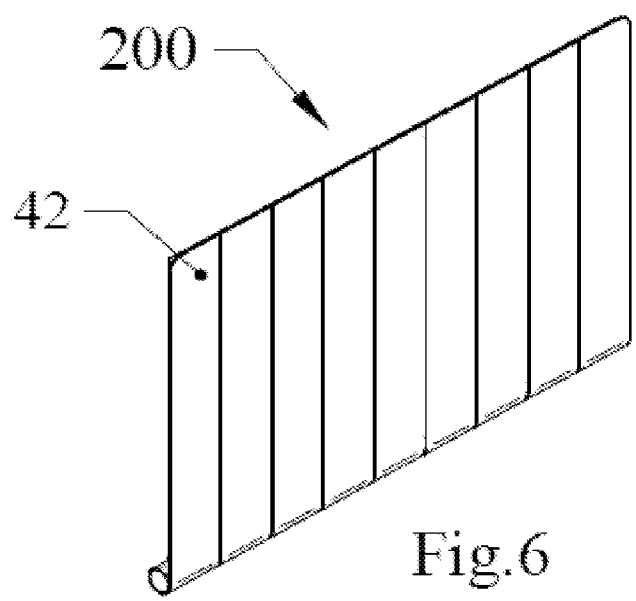
FIG. 6 shows the same radiator as FIG. 5 with the covers of the tubular elements applied.
Figure 7:
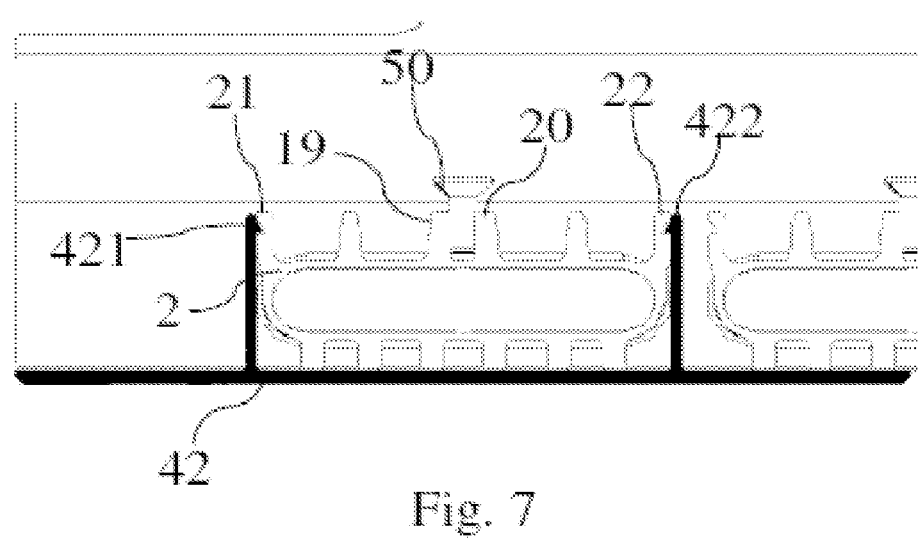
FIG. 7 shows a top view of a portion of the radiator according to FIG. 6, which shows a particular cover coupling on tubular section bar, by means of snap couplings.

The second face preferably comprises a pair of fins 19 and 20 arranged at a suitable distance to allow the wall installation of radiator 200 obtained from section bar 100, on these fins the self-threading is engaged which allows the fixing of crosspiece 30, with a structural function and for wall installation, a pair of terminal fins 21 and 22 intended to support a cover 42 shown in FIGS. 6 and 7, and with a thermal function, fins 17 and 18 having an exclusively thermal purpose.

According to the present invention, if H is the height of a fin and D is the reciprocal distance between two consecutive fins, the relation between the distance D and the fin height H must be greater than or equal to 1.4:

$$\frac{D}{H} \geq 1,4$$

Therefore, contrary to what is taught by known art, the fins 11-16 must be sufficiently spaced with the object of optimizing the heat exchange of radiator 200 with the external environment which affects the heat transfer process from the thermal source to the radiator by means of the vector fluid.

The fins 17 and 18 are more distant from the respective fins 21, 22 and 19, 20, since the introduction of further fins would not have respected the aforementioned relation; therefore, also fins 19, 20 and 21, 22 contribute to the heat exchange with the external environment, even though they also perform mechanical functions.

With respect to the known art, which teaches to increase the number of fins and to the opposite consideration that with the increase of the radiator construction material the radiator thermal inertia increases with a consequent performance degradation thereof, the present invention identifies a watershed which solves the problem of heat exchange optimization.

Said value limit of 1.4 of the aforementioned relation was identified after numerous, expensive laboratory tests, varying all the section bar dimensional parameters, including the number of segments 23 and 24 identifying respective vapour circulation channels.

As a result of said tests, therefore, it was understood that, in order for the biphasic heat exchange process to remain efficient, only the aforementioned relation of the section bar dimensional parameters counts.

As regards the number of vapour circulation channels, and more generally the biphasic fluid, said number is reduced as a function of the mechanical resistance of the tubular element obtained, so as to ensure the maximum efflux section possible which allows the film of condensate to re-descend with a suitable speed.

The thickness of every part of section bar 100 is reduced to the minimum in order to reduce the thermal inertia and improve the time constant during the transients.

The reduced height H of frontal fins 11-16 advantageously allows the tubular element 2-4 to be moved forward. By reducing the height H, the thermal resistance between tubular section bar and cover 42 is reduced.

The section bar may be advantageously obtained by extrusion, preferably of aluminium alloys, with the object of constructing radiators of various heights based on specific requirements of the case without increased manufacturing costs.

The aluminium alloy allows precision mechanical processes which are necessary in order to provide the joints between the parts defining radiator 200, and particularly between collector 1 and the tubular elements 2-4 obtained from section bar 100. These joints can be made by brazing, gluing or by engagement/expanding with and without gaskets.

The aluminium alloy EN AW 6060-T6 is preferred for providing the section bars according to the present invention, due to the mechanical resistance characteristics, so as to be able to reduce the thickness of the section bar with the same internal pressure, so as to raise the operating temperature and maximize the radiating efficiency of the radiating body. The internal pressure is determined by the saturation curve of the vector fluid in the vapour state and increases with the increasing of temperature.

According to a preferred variation of the present invention, a biphasic radiator 200 comprises a long-shaped tubular collector 1 upon which a first end is engaged of one or more tubular elements 2-4 obtained from section bar 100.

It is preferred to prepare the radiator so that it can be assembled with the collector lying parallel to a floor of the room and the tubular elements 2-4 lying perpendicular to the vehicular floor, so as to be vertical, i.e. parallel to a wall adjoining the room.

In such a circumstance, first face 101 faces the room to be heated, while the second face 102 of each tubular element 2-4 faces the room wall.

According to another aspect of the invention, it is convenient to reduce the number of fins in part 102 of section bar 100 since the proximity of the radiator to the room or supporting wall determines a greater heating of a smaller quantity of air.

In this way, the radiator transfers heat to the room to the same extent by means of both faces 101 and 102.

Advantageously, the radiator 200 being a closed evaporation and condensation system, it does not comprise a junction collector in the upper part of the tubular elements; i.e., in other words, the vapour rises and subsequently descends condensed in each of the singular tubular elements 2-4.

Figure 11:
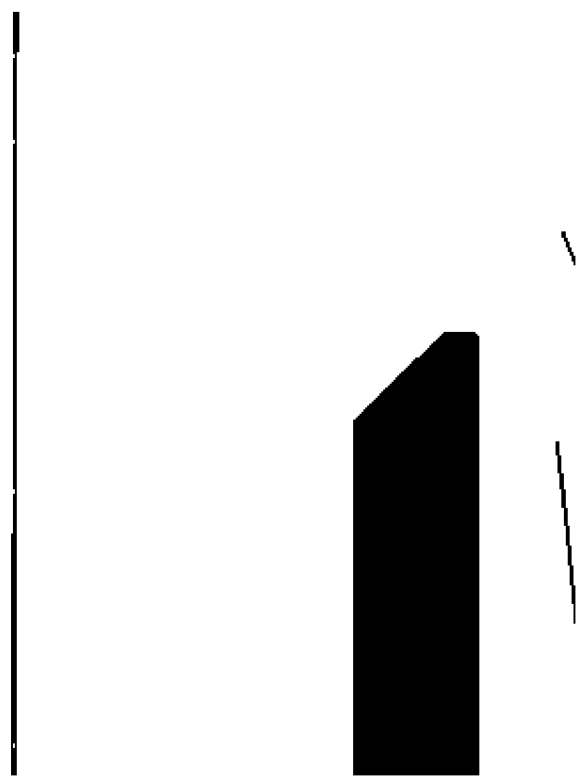
FIG. 11 shows a CFD (Computational Fluid Dynamics) simulation of the air fluid threads which lap against a radiator according to the preceding figures.

This leads to the advantage of being able to improve the chimney effect, having an outlet without obstacles for the air on the top of the radiator: the air leaves the radiator without curving, as can also be seen in CFD simulations shown in FIG. 11.

Furthermore, being able to take advantage of a reduction of the section of the circulation channels and the capacity of the fluid at low surface tension to infiltrate into the narrowest channels, it is possible to provide a radiator with extremely thin vertical pipes by reducing the radiator weight and giving the possibility to position the radiator close to the room wall at the minimum distance possible therefrom, improving the chimney effect which is established between the radiator and the room wall.

Figures 3, 4:
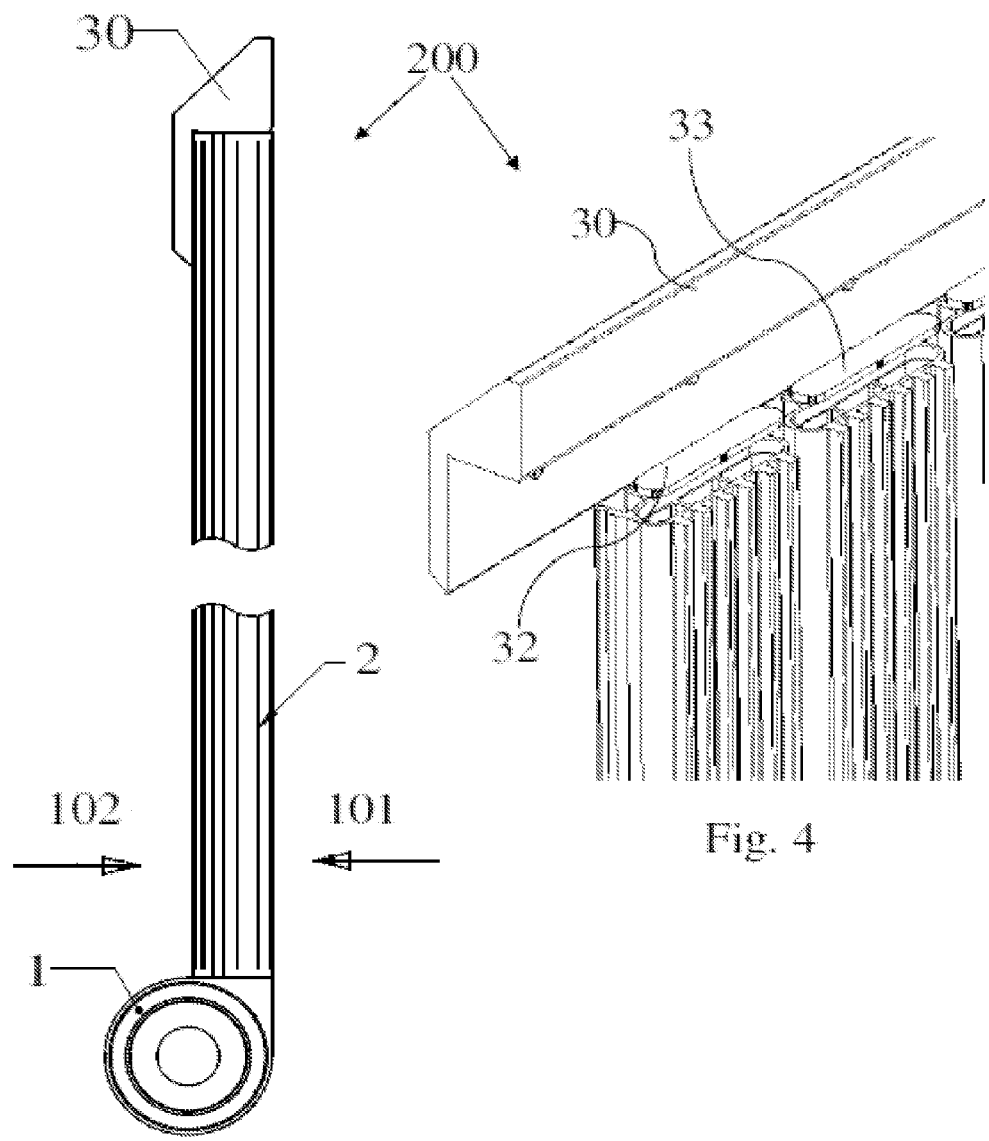
FIG. 3 shows a side view of the radiator according to FIG. 2.
FIG. 4 shows a perspective view of another portion of the radiator in FIG. 2.
Figure 5:
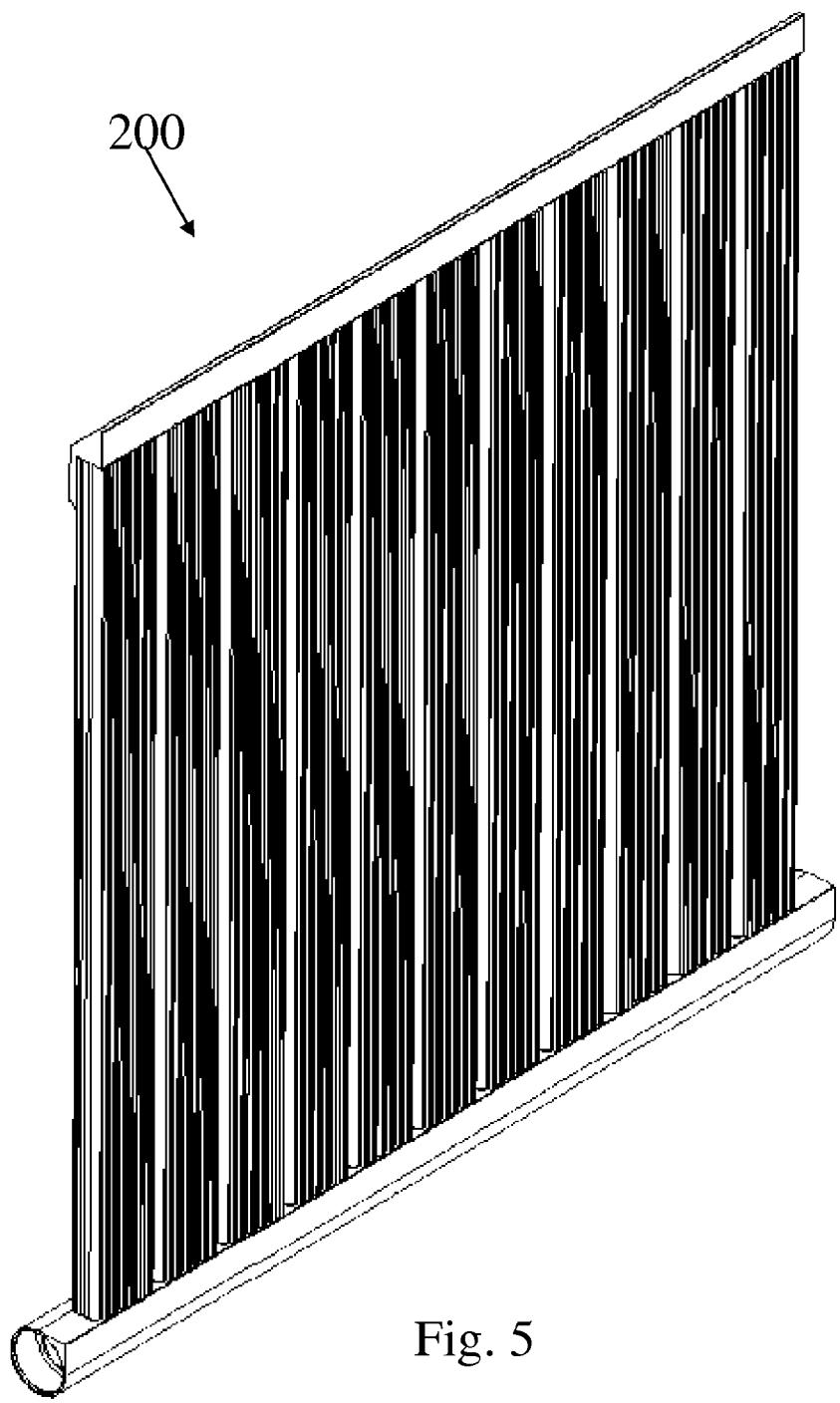
FIG. 5 shows an entire perspective view of the radiator according to FIGS. 2 to 4.

With particular reference to FIGS. 3 and 4, a crosspiece 30 can be assembled parallel to collector 1 in the free end of the tubular elements 2-4 which, as can be seen in FIG. 3, has a shape so as to narrow the air outlet between radiator 200 and the room wall before tapering upwards. This increases the speed of the fluid which laps against face 102 of the tubular elements, which detaching itself from crosspiece 30 also draws the fluid upwards which laps against face 101 of the elements themselves, improving the general efficiency of the radiator.

In FIG. 4, the respective plugs 32, 33, etc. can also be seen, which are intended to close the free end of each tubular element 2-4. In order to reduce the weight and thermal inertia, said plugs are flat and made by fine blanking which easily engage each tubular element 2-4 by means of a suitable number of interlocking teeth distributed along the perimeter of each plug.

Tubular element 2-4 has an abutment for plug 32, 33 which is fixed by means of brazing with brazing paste: torch brazing or in continuous tunnel furnace.

FIGS. 6 and 7 show suitable aesthetic covers 42 having a pi-shaped cross section, in which legs 421 and 422 are suitably toothed or hooked in order to permanently join together with the lugs 21 and 22 of section bar 100. From the figure, the connecting element 50 cooperating with the lugs 19 and 20 can also be noted.

Advantageously, the fact that the frontal lugs 11-16 respect the aformentioned relation implies that they are sufficiently stubby. Therefore, if a cover 42 is used, the heat is easily transferred to cover 42 which is interposed between the radiator and the air without nullifying the biphasic transfer process.

Figure 8:
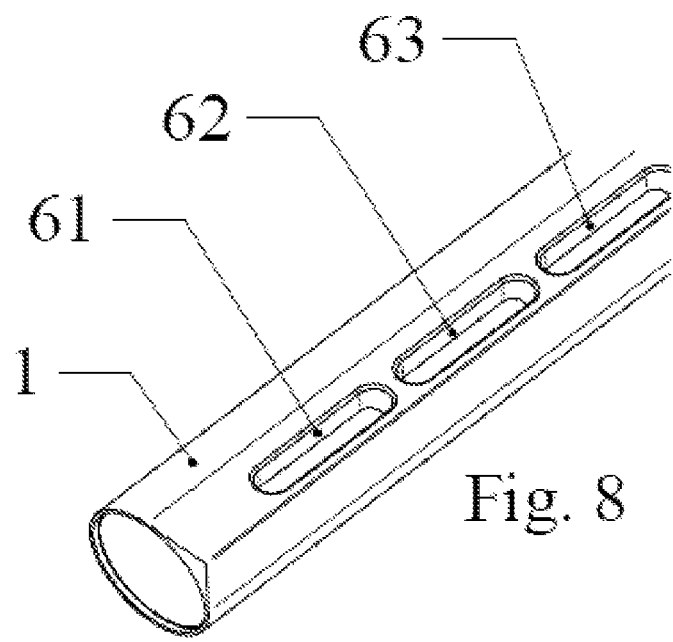
FIG. 8 shows a component of the radiator according to the preceding figures; with the collector with slotted holes for housing the tubular section bar.
Figure 9:
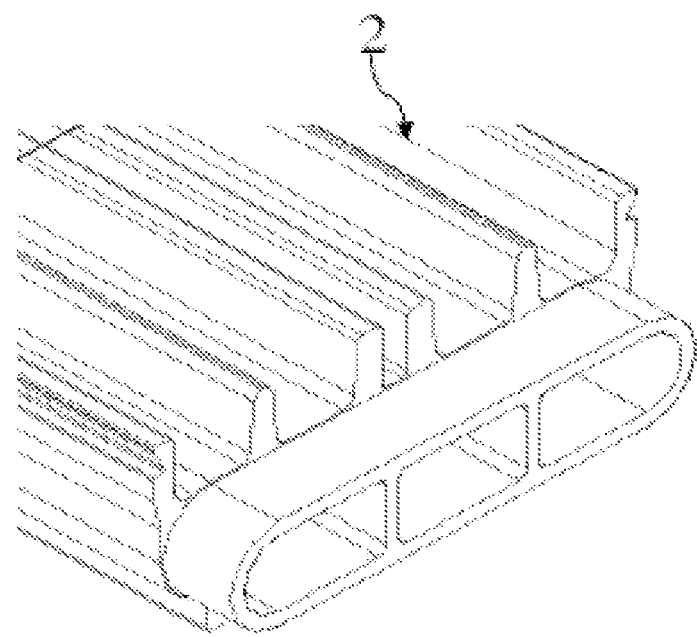
FIGS. 9 and 10 show opposite ends of a tubular element, respectively, which highlight the shape of said ends for the couplings which are necessary for the assembly of the radiator according to the preceding figures; in particular, in FIG. 9, the male coupling is depicted which engages on the slotted holes of the collector in FIG. 8.

FIG. 8 shows a collector 1 with respective hollows 61-63 adapted to accommodate the first end of a tubular element 2. It is clear from FIG. 9 that said first end is free from the external finning in order to allow it to easily engage in one of the hollows 61-62 of collector 1.

Figure 10:
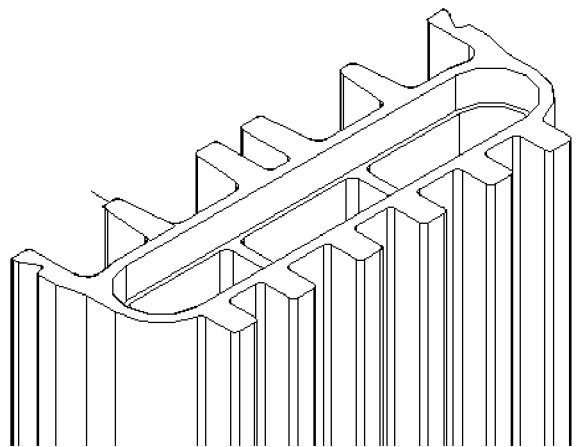

FIG. 10, shows a second end of a tubular element 2-6 tooled so as to be able to accommodate a respective plug 32, 33, etc.

The elements and features shown in the various preferred embodiments can be combined, without however departing from the scope of protection of the present application.

A person skilled in the art can easily understand the features of the invention From the description and accompanying drawings.

The invention claimed is:

1. A tubular section bar for a biphasic radiator comprising a tubular body
having a perimeter surface and
defining a longitudinal axis,
several surface lugs radially protruding at a height H from at least one portion of said perimeter surface and extending in an axial direction,
two consecutive lugs being arranged at a reciprocal distance D,
the section bar being characterised in that a relation between said reciprocal distance D and said height H is greater than or equal to 1.4

$$\left(\frac{D}{H} \geq 1,4\right).$$

2. A section bar according to claim 1, wherein said tubular body has a section having a flattened shape so as to identify two opposing faces which are substantially flat and parallel to each other, so that the lugs are also flat and parallel to each other.

3. The section bar according to claim 2, wherein a pair of lugs is further adapted to join together with fixing means, for fixing to the wall of the tubular section bar.

4. The section bar according to claim 2, comprising at least one pair of lugs adapted to define a coupling for a covering element.

5. A biphasic radiator comprising at least one tubular element made by means of a tubular section bar according to claim 1.

6. The biphasic radiator according to claim 5, comprising a long-shaped tubular collector, a perimeter surface in which at least a cavity is obtained, which is shaped to be permanently engaged by an end of at least one tubular element.

7. The biphasic radiator according to claim 6, comprising a respective plug of said at least one tubular element and wherein said at least one tubular element comprises a second end tooled to receive in coupling said respective plug.

8. The biphasic radiator according to 6, comprising at least one covering element having a pi-shaped cross section and two respective toothed legs which are shaped to join with said pair of lugs of the tubular section bar.

9. The biphasic radiator according to claim 6, comprising an upper crosspiece fixed to said second end of the at least one tubular element, so as to be parallel with said collector.

10. The biphasic radiator according to claim 5, comprising a respective plug of said at least one tubular element and wherein said at least one tubular element comprises a second end tooled to receive in coupling said respective plug.

11. The biphasic radiator according to claim 10, comprising at least one covering element having a pi-shaped cross section and two respective toothed legs which are shaped to join with said pair of lugs of the tubular section bar.

12. The biphasic radiator according to claim 10, comprising an upper crosspiece fixed to said second end of the at least one tubular element, so as to be parallel with said collector.

13. The biphasic radiator according to claim 5, comprising at least one covering element having a pi-shaped cross section and two respective toothed legs which are shaped to join with said pair of lugs of the tubular section bar.

14. The biphasic radiator according to claim 13, comprising an upper crosspiece fixed to said second end of the at least one tubular element, so as to be parallel with said collector.

15. The biphasic radiator according to claim 5, comprising an upper crosspiece fixed to said second end of the at least one tubular element, so as to be parallel with said collector.

16. The biphasic radiator according to claim 15, wherein said small crosspiece is shaped in order to narrow an air outlet between the radiator and a room wall before tapering upwards.

\* \* \* \* \*